(12) United States Patent
Chehebar

(10) Patent No.: US 11,242,079 B1
(45) Date of Patent: Feb. 8, 2022

(54) REMOVABLE AND DISPOSABLE FITTED PLASTIC COVER OR ENCLOSURE FOR COVERING THE HANDLE OF A SHOPPING CART AND A LUGGAGE CART

(71) Applicant: Charles Chehebar, New York, NY (US)

(72) Inventor: Charles Chehebar, New York, NY (US)

(*) Notice: Subject to any disclaimer, the term of this patent is extended or adjusted under 35 U.S.C. 154(b) by 0 days.

(21) Appl. No.: 17/030,670

(22) Filed: Sep. 24, 2020

(51) Int. Cl.
*B62B 5/06* (2006.01)

(52) U.S. Cl.
CPC .................... *B62B 5/069* (2013.01)

(58) Field of Classification Search
CPC ................. B62B 5/069; B62B 5/06
USPC ..................................... 280/33.992
See application file for complete search history.

(56) References Cited

U.S. PATENT DOCUMENTS

| | | | | |
|---|---|---|---|---|
| 2,751,957 A | * | 6/1956 | Langerman | B62B 9/20 74/558.5 |
| 5,820,142 A | * | 10/1998 | Duer | B62B 5/069 280/33.992 |
| 6,832,766 B2 | * | 12/2004 | Stokes | B62B 3/1456 150/154 |
| D521,207 S | * | 5/2006 | Anderson | B62B 5/069 D34/27 |
| 7,281,718 B2 | * | 10/2007 | Malchow | B62B 3/1408 150/154 |
| 9,676,406 B1 | * | 6/2017 | Kocurek | B62B 5/069 |
| 2008/0191435 A1 | * | 8/2008 | Guercia | B62B 3/1408 280/33.992 |
| 2008/0303230 A1 | * | 12/2008 | Somberg | B62B 5/06 280/33.992 |
| 2012/0148783 A1 | * | 6/2012 | Kunkleman | B62B 5/069 428/43 |
| 2012/0240307 A1 | * | 9/2012 | Terrell | B62B 5/069 2/158 |
| 2016/0200341 A1 | * | 7/2016 | Hall | B62B 5/069 280/33.992 |

* cited by examiner

*Primary Examiner* — John D Walters
(74) *Attorney, Agent, or Firm* — Ezra Sutton

(57) ABSTRACT

The present invention provides a removable and disposable fitted plastic enclosure or cover for covering a shopping cart handle or a luggage cart handle for cleanliness. The plastic enclosure has two closed sides, three closed edges, and one open side for snuggly receiving in the enclosure a handle of a shopping cart or a luggage cart. The two closed sides preferably include two rectangular shaped sides facing each other for covering and enclosing the handle. The three edges include three narrow surrounding closed edges to form the enclosure. Further, a plurality of enclosures are detachably connected in and end-to-end relationship to form a continuous roll of detachable plastic enclosures, which are disposable after use.

4 Claims, 4 Drawing Sheets

REMOVABLE AND DISPOSABLE FITTED PLASTIC COVER OR ENCLOSURE FOR COVERING THE HANDLE OF A SHOPPING CART AND A LUGGAGE CART

FIELD OF THE INVENTION

The present invention relates to a removable and disposable fitted plastic cover or enclosure for covering the handle of a shopping cart and a luggage cart for cleanliness.

BACKGROUND OF THE INVENTION

As a result of the virus and other germs, there is a need for easily covering handles and other devices that are reused and touched each day by many people.

For example, shopping carts with handles, and carts with handles for transporting all types of products, used in retail stores, warehouses, airports, and other places, must be kept sanitary and clean for reuse by different people during the course of a day. However, it is difficult to re-clean every type of handle that is reused on carts.

Accordingly, there is a need for a disposable cover that is easily and quickly placed on a cart for cleanliness, and is also easy to remove, and replaced with another cover.

DESCRIPTION OF THE PRIOR ART

The removable and disposable fitted plastic enclosure or cover for covering the handles of shopping carts and luggage carts of the present invention do no presently exist. The present invention has been developed to safely allow shopping carts and luggage carts to have plastic handle enclosures or covers by placing a removable and disposable plastic cover on each cart handle before the cart is used.

Further, the enclosures are detachably connected in and end-to-end relationship to form a roll of easily detachable and disposable plastic enclosures or covers.

OBJECTS OF THE INVENTION

It is an object of the present invention to provide a removable fitted plastic handle enclosures for a shopping cart or a luggage cart.

Another object of the present invention is to provide a disposable fitted plastic handle enclosures for a shopping cart or a luggage cart.

Another object of the present invention is to provide the fitted plastic enclosures, so they are connected end-to-end, so that they can be mounted on a roll of disposable plastic enclosures.

Another object of the present invention is to provide inexpensive fitted plastic handle enclosures or covers.

Another object of the present invention is to provide plastic covers that are easy and quick to use.

SUMMARY OF THE INVENTION

The present invention provides a removable and disposable fitted plastic enclosure or cover for covering a shopping cart handle or a luggage cart handle for cleanliness. The plastic enclosure has two closed sides, three closed edges, and one open side for snuggly receiving in the enclosure a handle of a shopping cart or a luggage cart. The two closed sides preferably include two rectangular shaped sides facing each other for covering and enclosing the handle. The three edges include three narrow surrounding closed edges to form the enclosure. Further, a plurality of enclosures are detachably connected in and end-to-end relationship to form a continuous roll of detachable plastic enclosures, which are disposable after use.

DETAILED DESCRIPTION OF THE PREFERRED EMBODIMENT

Figure 1:
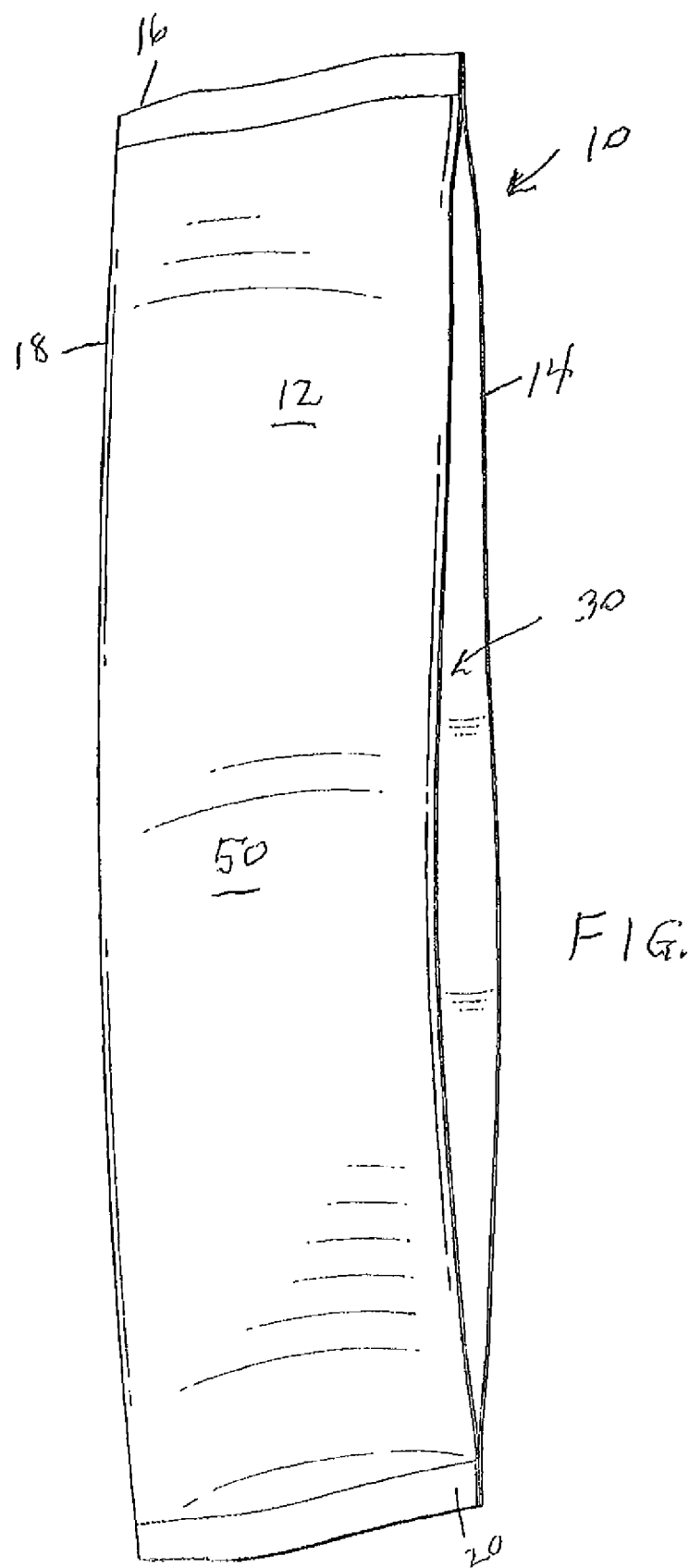
FIG. 1 is a perspective view of the removable and disposable fitted plastic handle enclosure for covering the handle of a shopping cart or a luggage cart of the present invention.
Figure 2:
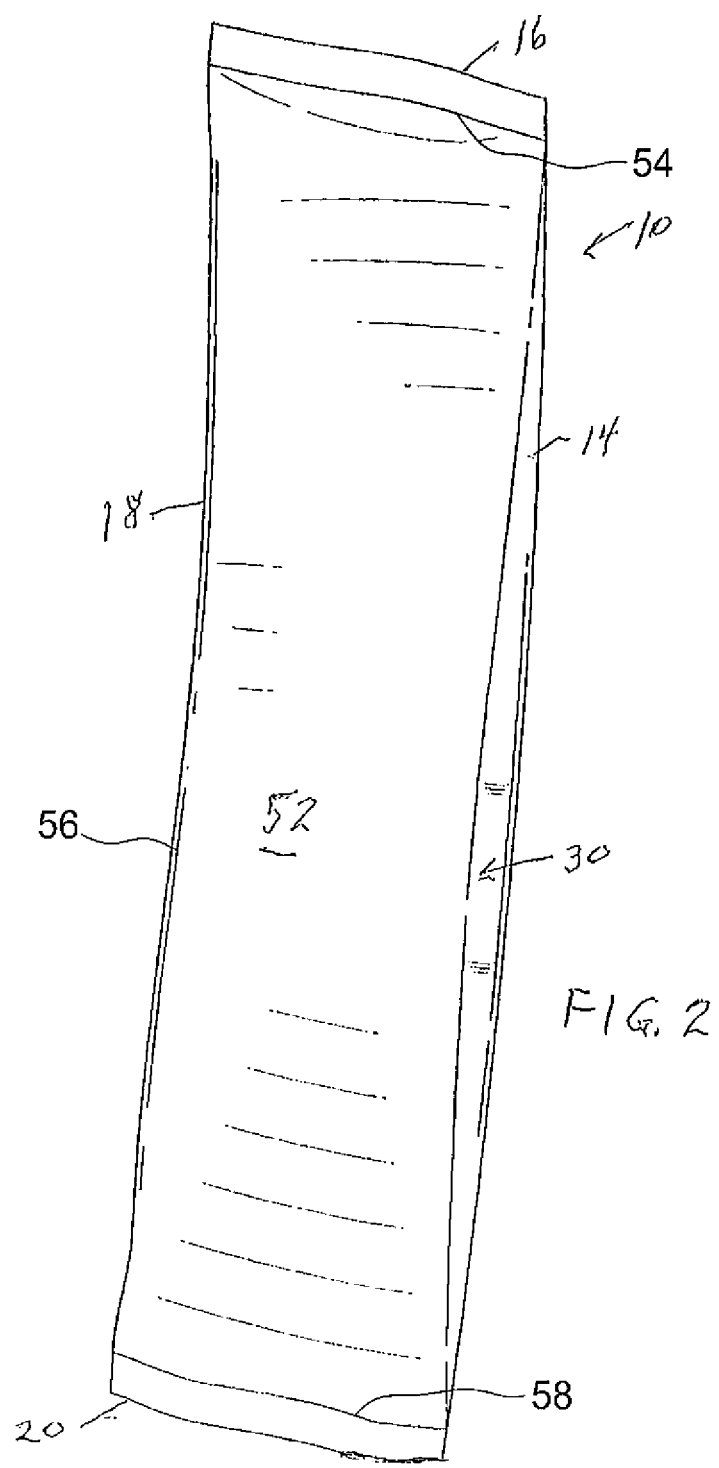
FIG. 2 is a perspective view of the opposite side of the enclosure or cover.
Figure 3:
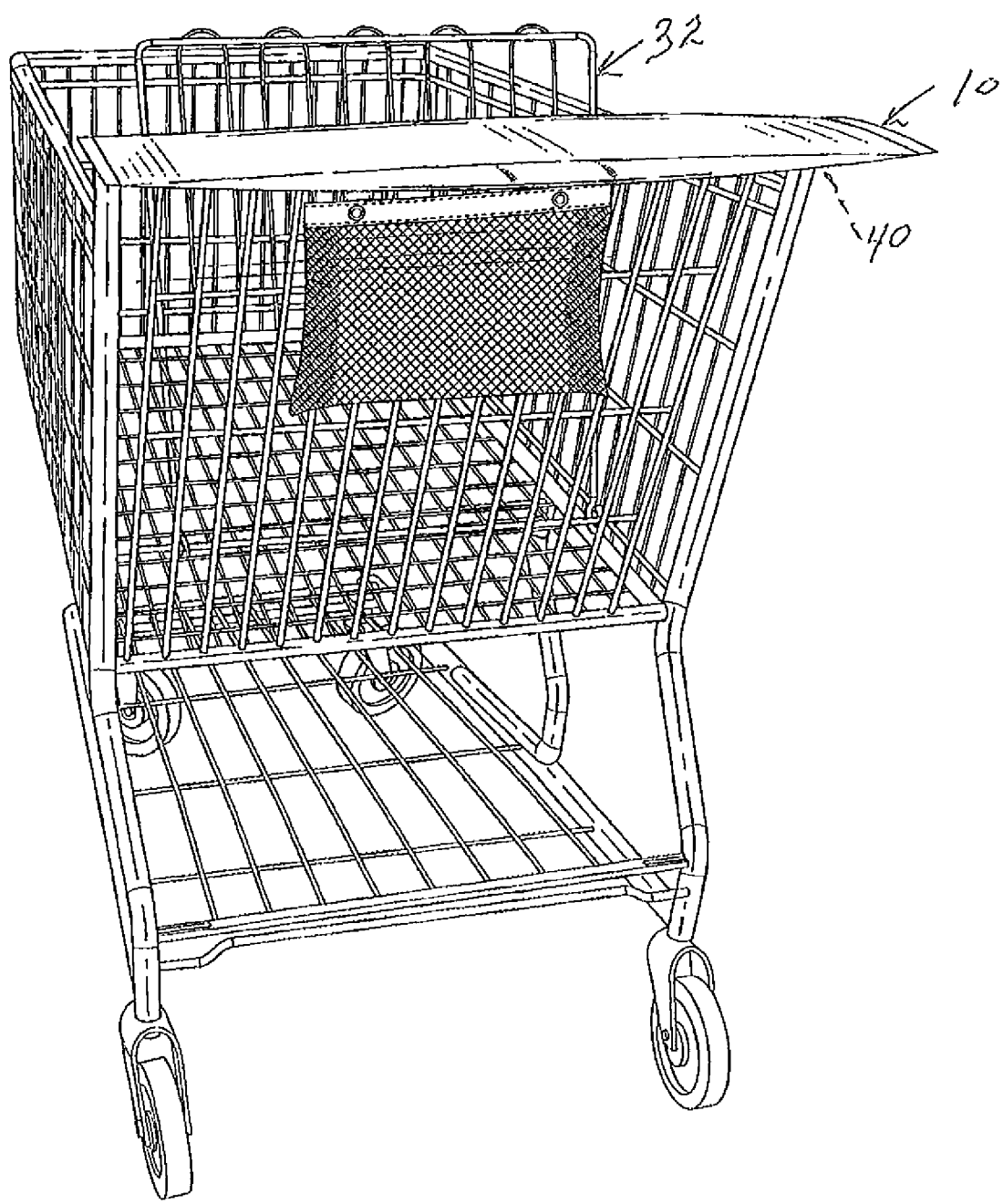
FIG. 3 is a perspective view of a shopping cart having a handle covered by the enclosure or cover.
Figure 4:
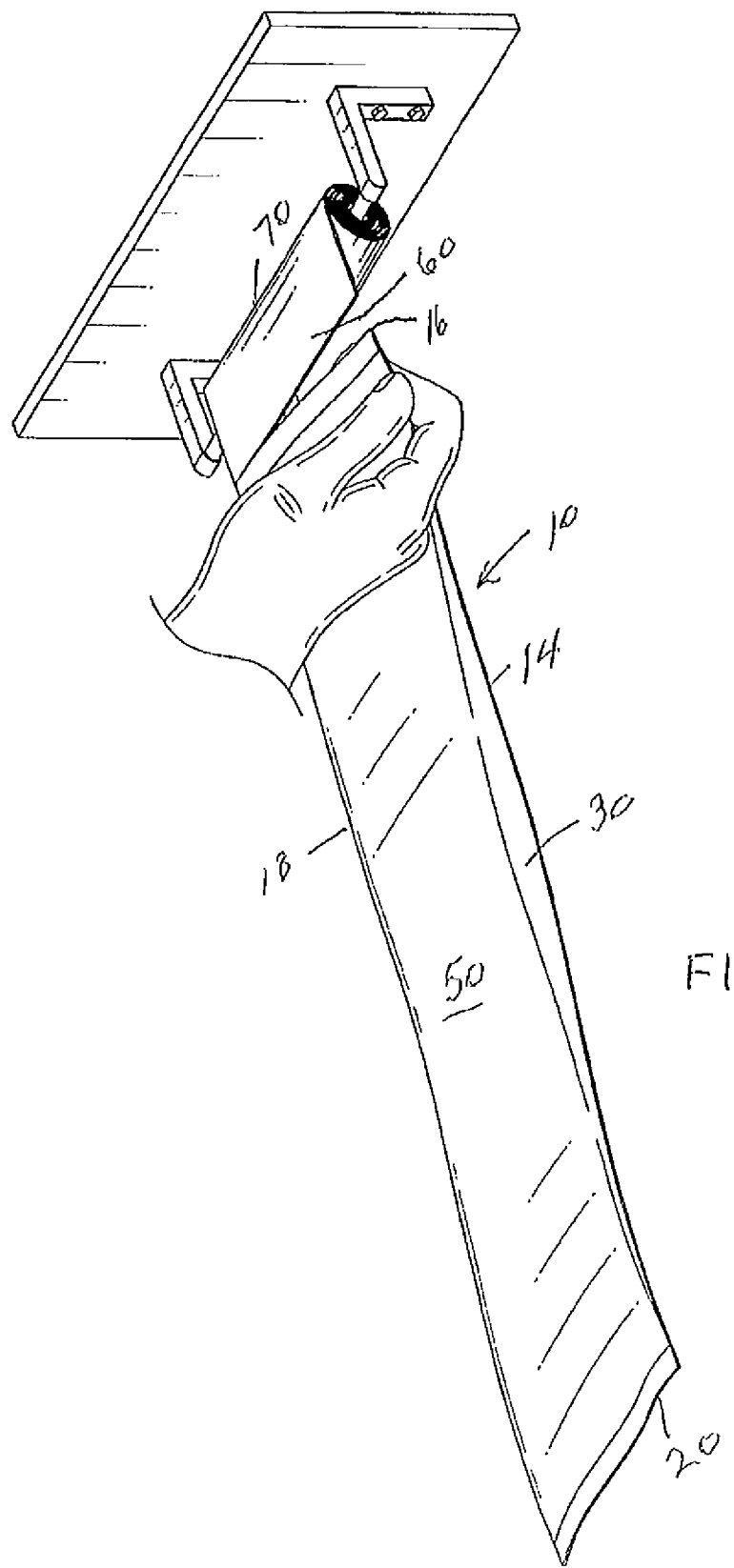
FIG. 4 is a perspective view of the enclosures being detachably connected to each other to form a roll of end-to-end enclosures disposed on a roll.

The present invention provides a removable and disposable fitted plastic enclosure 10 for covering a shopping cart handle or a luggage cart handle 32 for cleanliness.

The plastic enclosure 10 has two closed sides 12 and 14, and three closed edges 16, 18, and 20; and one open side 30 for snuggly receiving in the enclosure 10 a handle 40 of a shopping cart 32 or a luggage cart.

The two closed sides 12 and 14 have two rectangular side walls 50 and 52 that face each other for covering and enclosing the handle 40, and further include three narrow surrounding closed edges 54, 56, 58 to form the substantially flat enclosure 10 in order to snuggly receive and cover the cart handle 40.

Preferably, the rectangular shaped walls 50 and 52 of the enclosure 10 are at least 24 inches long and 5 inches wide to snuggly cover the handle 40.

In addition, one of the end edges 20 of the enclosure 10 is detachably connected to the end edge 60 of a second enclosure, so that a plurality of at least 50 enclosures are detachably connected to each other in an end-to-end relationship to form a roll 70 of plastic envelopes, which are disposed after use.

OPERATION

The present invention provides a removable and disposable fitted plastic enclosure for covering a shopping cart handle or a luggage cart handle for cleanliness. The plastic enclosure has one open side for snuggly receiving in the enclosure a handle of a shopping cart or a luggage cart. Further, a plurality of enclosures are detachably connected in an end-to-end relationship to form a continuous roll of detachable plastic enclosures.

ADVANTAGES OF THE PRESENT INVENTION

It is an advantage of the present invention to provide a removable fitted plastic handle enclosures for a shopping cart or a luggage cart.

Another advantage of the present invention is to provide a disposable fitted plastic handle enclosures for a shopping cart or a luggage cart.

Another advantage of the present invention is to provide the fitted plastic enclosures, so they are connected end-to-end, so that they can be mounted on a roll of disposable plastic enclosures.

Another advantage present invention is to provide inexpensive fitted plastic handle enclosures or covers.

Another advantage of the present invention is to provide plastic covers that are easy and quick to use.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A removable and disposable fitted plastic enclosure for covering a shopping cart handle or a luggage cart handle for cleanliness, comprising:
   a) a plastic enclosure having two closed sides, three closed edges, and one open side for snuggly receiving in said enclosure the handle of the shopping cart or the handle of the luggage cart; and
   b) said two closed sides including two rectangular shaped sides facing each other for covering and enclosing the handle, and further including three narrow surrounding closed edges to form said enclosure, in order to receive said cart handle.

2. The removable plastic enclosure of claim 1, wherein one of said end edges of said enclosure is detachably connected to the end edge of a second enclosure, so that a plurality of enclosures are detachably connected to each other in an end-to-end configuration to form a continuous roll of plastic enclosures.

3. The removable plastic enclosure of claim 2, wherein each of said rectangular shaped sides is at least 24 inches long and 5 inches wide.

4. The removable plastic enclosure of claim 3, wherein said roll includes at least 50 enclosures, each being connected end-to-end.

* * * * *